(12) United States Patent
Wright et al.

(10) Patent No.: US 7,940,259 B2
(45) Date of Patent: May 10, 2011

(54) SYSTEM AND METHOD FOR INTERACTIVE 3D AIR REGIONS

(75) Inventors: William Wright, Toronto (CA); Thomas Kapler, Toronto (CA); Christopher Bethune, Scarborough (CA)

(73) Assignee: Oculus Info Inc., Toronto (CA)

( * ) Notice: Subject to any disclaimer, the term of this patent is extended or adjusted under 35 U.S.C. 154(b) by 0 days.

(21) Appl. No.: 11/289,380

(22) Filed: Nov. 30, 2005

(65) Prior Publication Data

US 2006/0146048 A1 Jul. 6, 2006

Related U.S. Application Data

(60) Provisional application No. 60/631,601, filed on Nov. 30, 2004.

(51) Int. Cl.
*G06T 15/00* (2006.01)
*G06T 1/00* (2006.01)
(52) U.S. Cl. ........................................ 345/419; 345/418
(58) Field of Classification Search .................. None
See application file for complete search history.

(56) References Cited

U.S. PATENT DOCUMENTS

| | | | | |
|---|---|---|---|---|
| 5,548,515 A | * | 8/1996 | Pilley et al. | 701/120 |
| 5,583,977 A | * | 12/1996 | Seidl | 345/619 |
| 6,266,610 B1 | * | 7/2001 | Schultz et al. | 701/201 |
| 6,314,362 B1 | * | 11/2001 | Erzberger et al. | 701/120 |
| 6,421,603 B1 | | 7/2002 | Pratt et al. | |

FOREIGN PATENT DOCUMENTS

WO WO 02/24530 A 3/2002

OTHER PUBLICATIONS

R. Azuma, H. Neely III, M. daily, and R. Geiss. Visualization tools for free flight air-traffic management. IEEE Computer Graphics and Applications, 20(5):32-36, Sep.-Oct. 2000.*
Azuma, Ronald, Mike Daily, and Jimmy Krozel. Advanced Human-Computer Interfaces for Air Traffic Management and Simulation. Proceedings of 1996 AIAA Flight Simulation Technologies Conference (San Diego, CA, Jul. 29-31, 1996), 656-666.*
Lange, M., Hjalmarsson, J., Cooper, M., Ynnerman, A., and Duong, V. Nov. 20-21, 2003. 3d visualization and 3d and voice interaction in air traffic management. In SIGRAD2003, The Annual SIGRAD Conference., Ume, Sweden.*

* cited by examiner

*Primary Examiner* — Daniel F Hajnik
(74) *Attorney, Agent, or Firm* — Grant Tisdall; Cowling Lafleur Henderson LLP

(57) ABSTRACT

A system and method for generating a region in an air-space environment for presentation in a visual representation. The region is configured for positioning in an aerial domain of the environment coupled to an adjacent reference domain of the environment. The system comprises a control element generator configured for providing a plurality of control elements of the region, wherein the plurality of control elements are distributed in the air-space environment such that each of the plurality of control elements is coupled to a respective coordinate associated with the reference domain the system and method also have a link generator configured for providing a plurality of link elements of the region for linking each of the control elements to one another to define a plurality of bounding surfaces of the region, and an edit module for adjusting at least one presentation property of the region.

27 Claims, 18 Drawing Sheets

SYSTEM AND METHOD FOR INTERACTIVE 3D AIR REGIONS

This application claims the benefit of U.S. Provisional Application No. 60/631,601, filed Nov. 30, 2004, herein incorporated by reference.

BACKGROUND

Monitoring and coordination of air regions, such as corridors, is a complex task, one that requires the user to have a complete understanding and awareness of the situation including interaction of the air regions with each other, with aircraft and with adjacent terrain details.

Traditional air traffic control systems for both military and commercial air traffic provide a 2-dimensional (2D), top-down plan view of an air-space environment. This is a severe limitation, because it forces the controllers to comprehend a 3-dimensional (3D) environment in a 2D system. Some modern systems attempt to remedy this problem by constructing the air space visualization in a 3D scene. While this does provide an advantage, the systems are quite simple in nature, and do not enhance the visualization with the display of properties of the airspace and of airspace objects and interaction techniques that are important when operating such a system.

Traditional systems for visualizing air corridors use a 2-dimensional, top down display. This is despite the fact that the information being displayed, the relationships between airplanes and air corridors, exists in 3D space. This creates difficulty in the creation and monitoring of air traffic relative to the real world due to typical concurrent use of air volumes by multiple airborne entities, such as but not limited to aircraft and airborne munitions.

ISD Data AB [5], in support of the Swedish Air Force, created a 3D display system for the training of air traffic controllers. ISD's system "shows altitude relationships between airplanes, restricted flight areas, and designated training areas in 3D environments, providing better understanding of the events in a 3D space." This system is designed for visualizing air traffic in the area immediately surrounding a control tower. However, this system simply shows a representation of the flight vector. This vector does not allow for an appropriate level of precision in airspace conflict resolution. This system is also limited in its ability to render 3D terrain information.

Command and Control Technologies Corporation [4] has created a system for aerospace traffic control, including mission planning and analysis of space launch vehicles. This system "renders space transition corridors, mission vehicle trajectories, Air Route Traffic Control Centers and sectors, and aircraft flight routes in 2D and 3D images positioned on accurate maps of the Earth and the U.S. national airspace system." However, this system does not provide for ease of flight route generation and interaction of the route visualisations for aircraft with respect to the adjacent terrain.

SDAT Enterprise has also produced a system for use in the analysis and design of airspace and traffic flows. It provides tools for global-scale visualizations of air traffic in a 3D environment. Geographic information is displayed using wire-frame models of boundaries, but without association to terrain detail. Air paths are shown as vector lines, only.

Lange et al. [1], in collaboration with the EuroControl Centre for R&D in air traffic control, have introduced a 3D VR (virtual reality) system for real time visual representation and manipulation of data in air traffic management and control. This system provides for the creation and management of air traffic routes on a varying scale, from airport level up to a global level. Visualization is provided via an immersive VR environment, using a 3D wand pointer for controlling movement about the scene. Interaction with flight paths is provided, wherein the user can select waypoints along the path to be adjusted. As in the SDAT system, air paths are represented as simple line vectors. The system uses a 3D model of the aircraft at its current place along the air path.

REFERENCES

1. Azuma, R. and Daily, M., *Advanced Human-Computer Interfaces For Air Traffic Management And Simulation*, Proceedings of 1996 AIAA Flight Simulation Technologies Conference (San Diego, Calif., 29-31 Jul. 1996)
2. Lange, M., et al., *3D Visualization and 3D and Voice Interaction in Air Traffic Management*, SIGRAD2003, The Annual SIGRAD Conference. Special Theme—Real-Time Simulations, Nov. 20-21, 2003, Umeå University, Umeå, Sweden
3. Federal Aviation Administration, *Sector Design and Analysis Tool*, http://www.faa.gov/ats/ata/ata_lab/sdat_info.htm
4. Command and Control Technologies, *Aerospace Traffic Control*, http://www.cctcorp.com/aero-traffic.html
5. Quantum3D, *Success Stores in Air Traffic Control Systems*, http://www.quantum3d.com/stories/isd.htm

BRIEF DESCRIPTION OF THE DRAWINGS

A better understanding of these and other embodiments of the present invention can be obtained with reference to the following drawings and detailed description of the preferred embodiments, by way of example only, in which:

FIG. 3 is a block diagram of a data processing system for a visualization tool providing visualization representations of FIGS. 1a and 2a;

FIG. 7 shows an example embodiment of a conflict of the air regions of FIGS. 1a and 2a;

FIG. 8 shows a control element adjustment mechanism of the air regions of FIGS. 1a and 2a;

DETAILED DESCRIPTION OF EMBODIMENTS

One aspect provided is a system for generating a region in an air-space environment for presentation in a visual representation, the region configured for positioning in an aerial domain of the environment coupled to an adjacent reference domain of the environment, the system comprising: a control element generator configured for providing a plurality of control elements of the region, the plurality of control elements for distribution in the air-space environment such that each of the plurality of control elements is coupled to a respective coordinate associated with the reference domain; a link generator configured for providing a plurality of link elements of the region for linking each of the control elements to one another to define a plurality of bounding surfaces of the region; and an edit module for adjusting at least one presentation property of the region.

A further aspect provided is a method for generating a region in an air-space environment for presentation in a visual representation, the region configured for positioning in an aerial domain of the environment coupled to an adjacent reference domain of the environment, the method comprising the steps of: providing a plurality of control elements of the region, the plurality of control elements for distribution in the air-space environment such that each of the plurality of control elements is coupled to a respective coordinate associated with the reference domain; providing a plurality of link elements of the region for linking each of the control elements to one another to define a plurality of bounding surfaces of the region; and adjusting at least one presentation property of the region.

Data Processing System 100

The following detailed description of the embodiments of a visualisation tool 12 (see FIG. 3) does not limit the implementation of the visualisation tool 12 to any particular computer programming language. The visualisation tool 12 may be implemented in any computer programming language provided that the OS (Operating System) provides the facilities that may support the requirements of the visualisation tool 12. One embodiment is implemented in the Java computer programming language (or other computer programming languages in conjunction with C/C++). Any limitations presented would be a result of a particular type of operating system, computer programming language, or data processing system and would not be a limitation of the visualisation tool 12, as further described below.

Figure 1A:
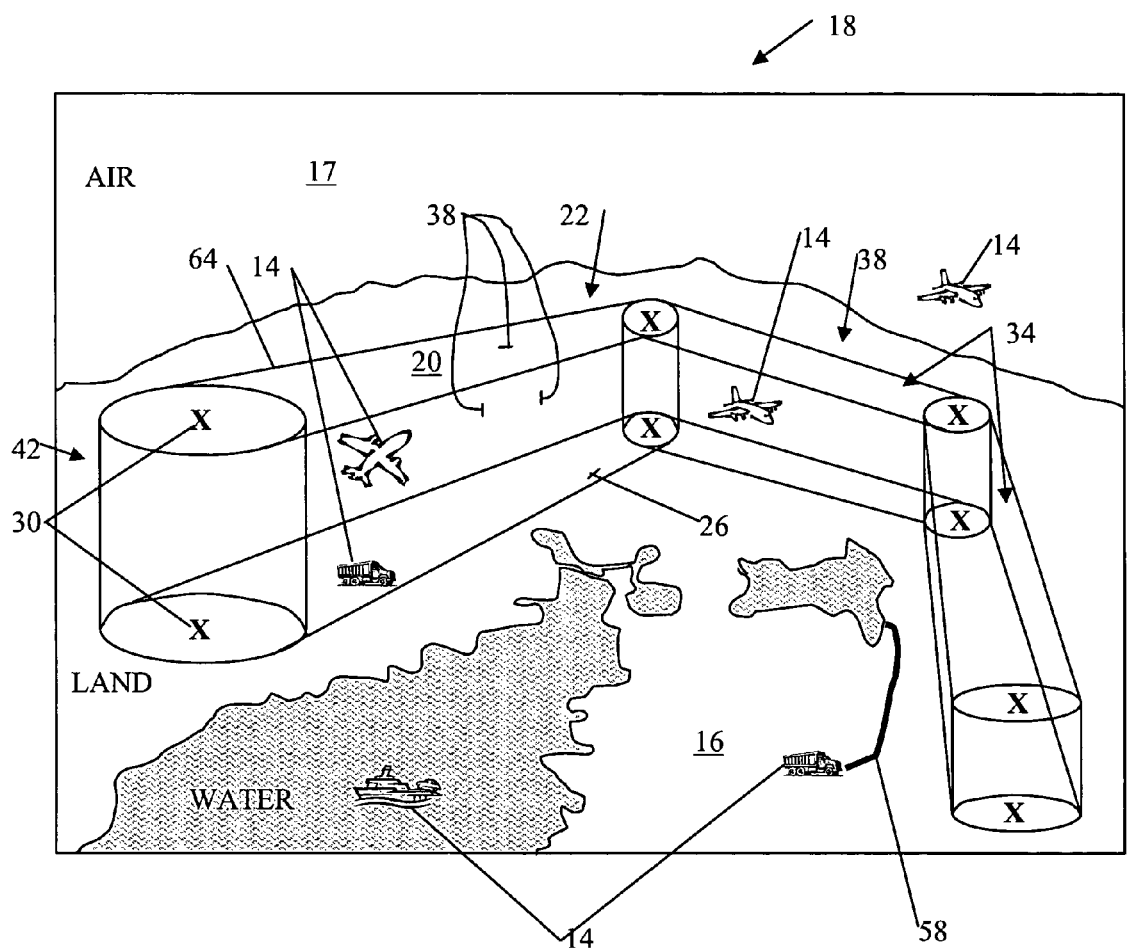
FIG. 1a is a schematic diagram showing a visualisation representation of an air region example.

Referring to FIG. 1a, shown is a visualisation representation 18 produced by the interactive aerial and terrestrial visualisation tool 12 (see FIG. 3) that extends on traditional air space visualization systems for both military and commercial air traffic, so as to provide the user with a 3D representation of the air-space environment in which he/she can work efficiently and optimally. FIG. 1a provides an example visualisation representation 18 showing the air-space environment (e.g. the air portion can include near atmosphere air environments as well as upper atmosphere and outer-space/extraterrestrial environments and the space portion can include terrestrial/terrain environments coupled to the air portion) having a spatial reference domain 16 along with an example air region 20 situated in an aerial domain 17. The tool 12 extends on this 3D representation 18 and provides a means of visualizing and interacting with air corridors in general to help provide for maximum functionality and ease of use. The tool 12 is used to couple advanced information visualization with novel interaction techniques. Example features of the tool 12 performed during generation and/or interaction with the visualisation representation 18 include features such as but not limited to: 3D Visualization; Air Path/volume Creation; Air Path/volume Rendering; Editing Air Paths/volumes in Real-Time; Following Air Paths/volumes; Synchronizing Air and Ground Manoeuvres; What If'ing scenarios; Aerial Line of Sight; and Conflict Detection and Display, as further described below.

Figure 3:
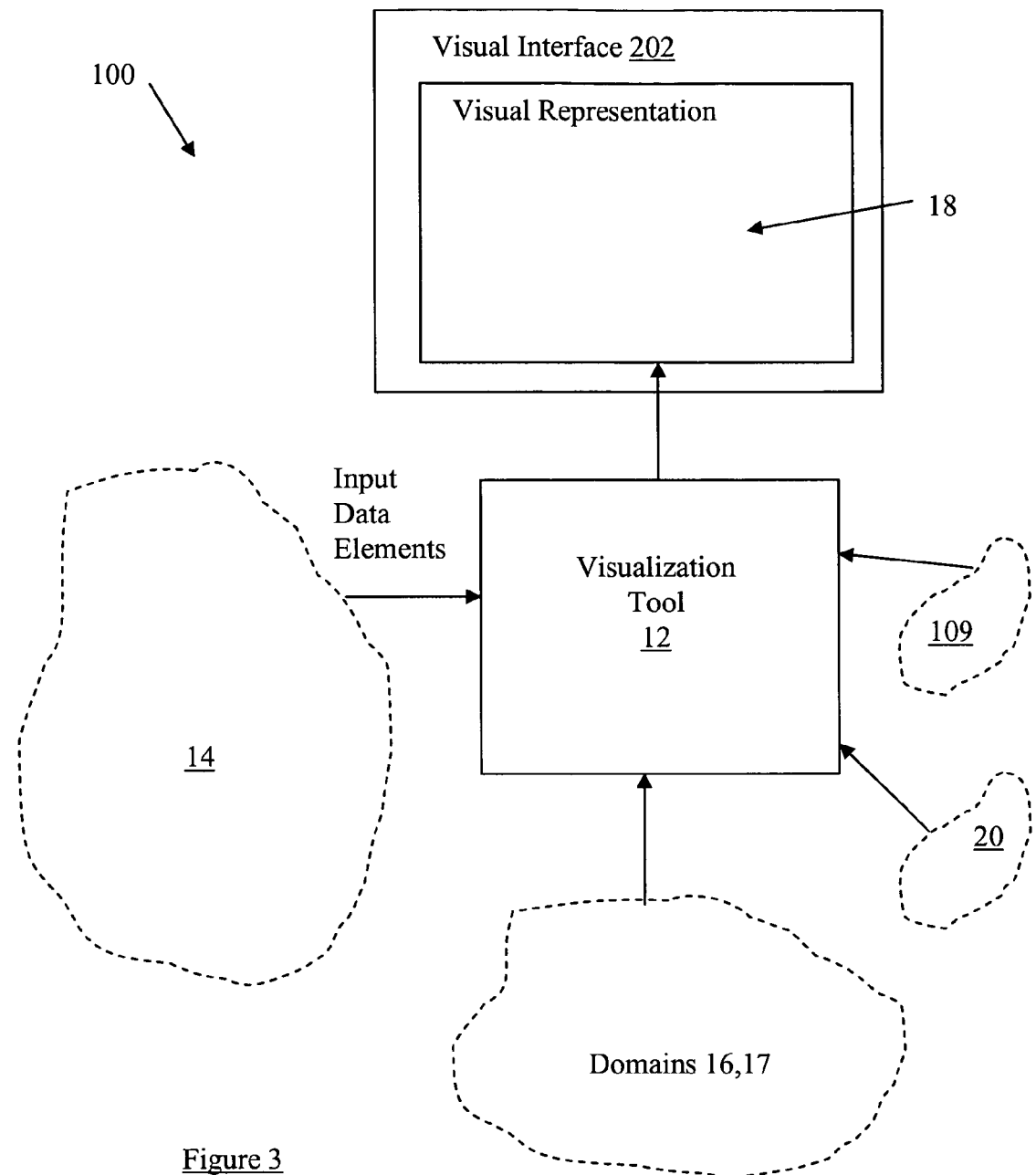

Referring to FIGS. 1a and 3, a visualization data processing system 100 includes the visualization tool 12 for processing a collection of data objects/elements/entities 14, such as but not limited to aircraft or other flying objects, ground based vehicles, buildings and personnel, and terrain items including rail road tracks, roads and power lines, valleys, hills, mountains, etc. . . . The data elements 14 are used as input to the tool 12 for rendering and presentation in the visualisation representation 18 on a visual interface 202. The data elements 14 can be combined with the selected reference spatial 16 (e.g. terrain) and aerial 17 domains by the tool 12, along with the generated air region 20 to generate the interactive visual representation 18 on the visual interface (VI) 202. Management of the data elements 14, the air regions 20, the aerial domain 17, and the reference domain 16 are driven by user events 109 of a user (not shown) via a user interface 108 (see FIG. 4), during interaction with the visual representation 18. Accordingly, it is recognised that the visualisation representation 18 can include data elements 14 such as but not limited to: Airspace, outer-space & near earth geometry; Geographic features; Aircraft & spacecraft; Political maps; Sector/center boundaries; SUA's; Flight Plans & airways; Information Overlays (information relating to other data elements 14); and man-made infrastructure (e.g. buildings). The air regions 20 have bounding surfaces 26,38, as further described below.

Figure 4:
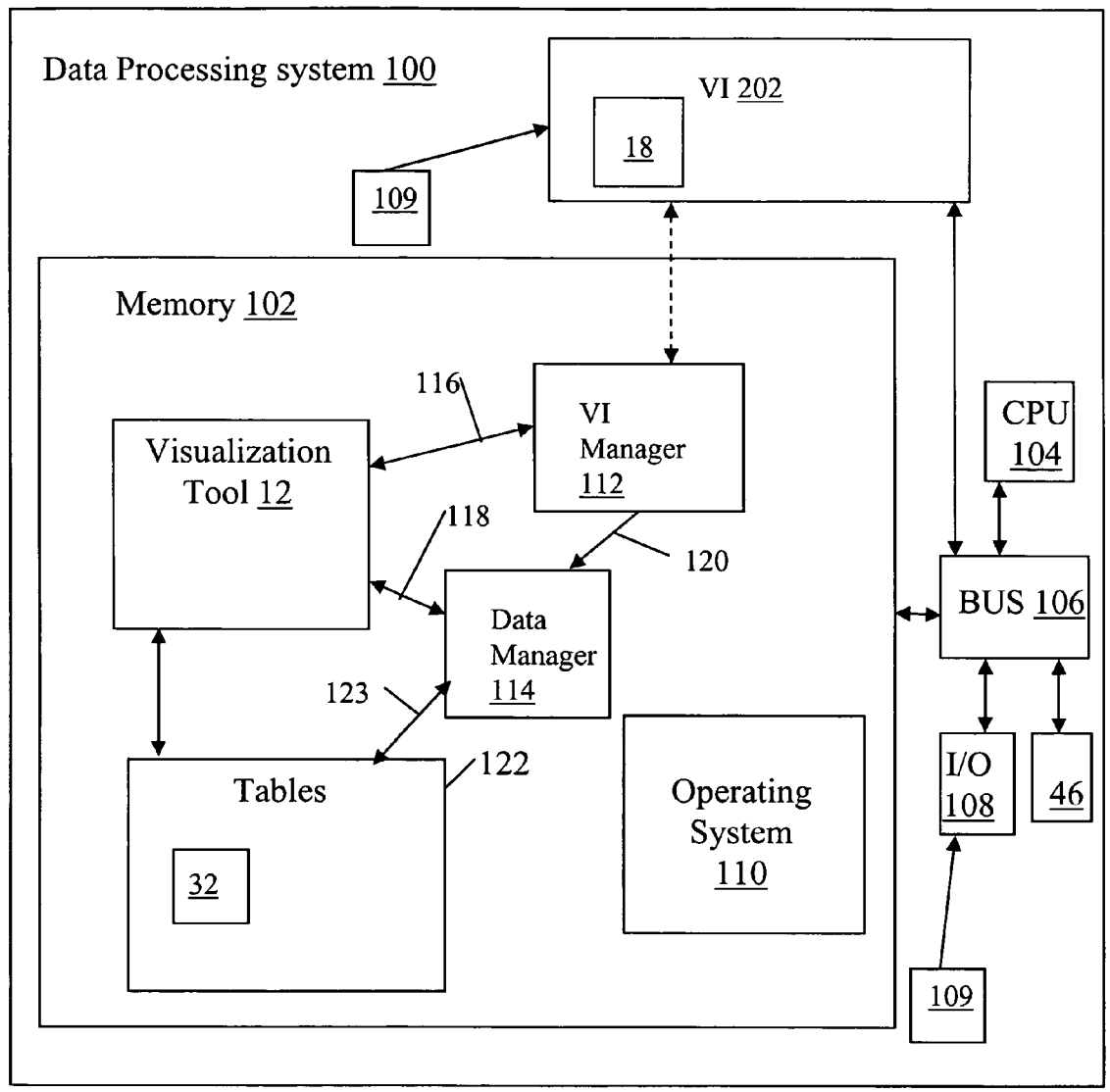
FIG. 4 shows further details of the data processing system of FIG. 3.

Referring to FIG. 4, the data processing system 100 has the user interface 108 for interacting with the tool 12, the user interface 108 connected to a memory 102 via a BUS 106. The interface 108 is coupled to a processor 104 via the BUS 106, to interact with user events 109 to monitor or otherwise instruct the operation of the tool 12 via an operating system 110. The user interface 108 can include one or more user input devices such as but not limited to a QWERTY keyboard, a keypad, a trackwheel, a stylus, a mouse, and a microphone. The visual interface 202 is considered the user output device, such as but not limited to a computer screen display. If the screen is touch sensitive, then the display can also be used as the user input device as controlled by the processor 104. Further, it is recognized that the data processing system 100 can include a computer readable storage medium 46 coupled to the processor 104 for providing instructions to the processor 104 and/or the tool 12. The computer readable medium 46 can include hardware and/or software for storing data via digital or analogue storage methods and the medium can be such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination. The medium 46 is a non-transitory medium.

Referring again to FIG. 4, the tool 12 interacts via link 116 with a VI manager 112 (also known as a visualization renderer—see FIG. 5) of the system 100 for presenting the visual representation 18 on the visual interface 202. The tool 12 also interacts via link 118 with a data manager 114 of the system 100 to coordinate management of the data elements 14, air regions 20, and domains 16,17 from data files or tables 122 of the memory 102. It is recognized that the elements 14 and domains 16,17 could be stored in the same or separate tables 122, as desired. The data manager 114 can receive requests for storing, retrieving, amending, or creating the elements 14 and domains 16,17 via the tool 12 and/or directly via link 120 from the VI manager 112, as driven by the user events 109 and/or independent operation of the tool 12. The data manager 114 manages the elements 14 and domains 16,17 via link 123 with the tables 122. It is recognized that the tables 122 could also contain predefined or otherwise stored air regions 20 already generated by the tool 12, as further described below. For example, predefined air regions 20 stored in the tables 122 could be used as templates 32 for initial superpositioning over the reference domain 16. The templates 32 could include a variety of predefined air region 20 shapes (e.g. an air path 22 with three joined links 34—see FIG. 1a or an air volume 24 in the shape of a pentagon—see FIG. 2a). The height/absolute size/geometry of the templates 32 could be modified by user events 109, as desired. Accordingly, the tool 12 and managers 112, 114 are used to coordinate the processing of data objects 14, domains 16,17, retrieval and/or generation of air regions 20 (including templates 32) and processing user events 109 with respect to the content of the screen representation 18 displayed in the visual interface 202.

Visualisation Tool 12

Figure 5:
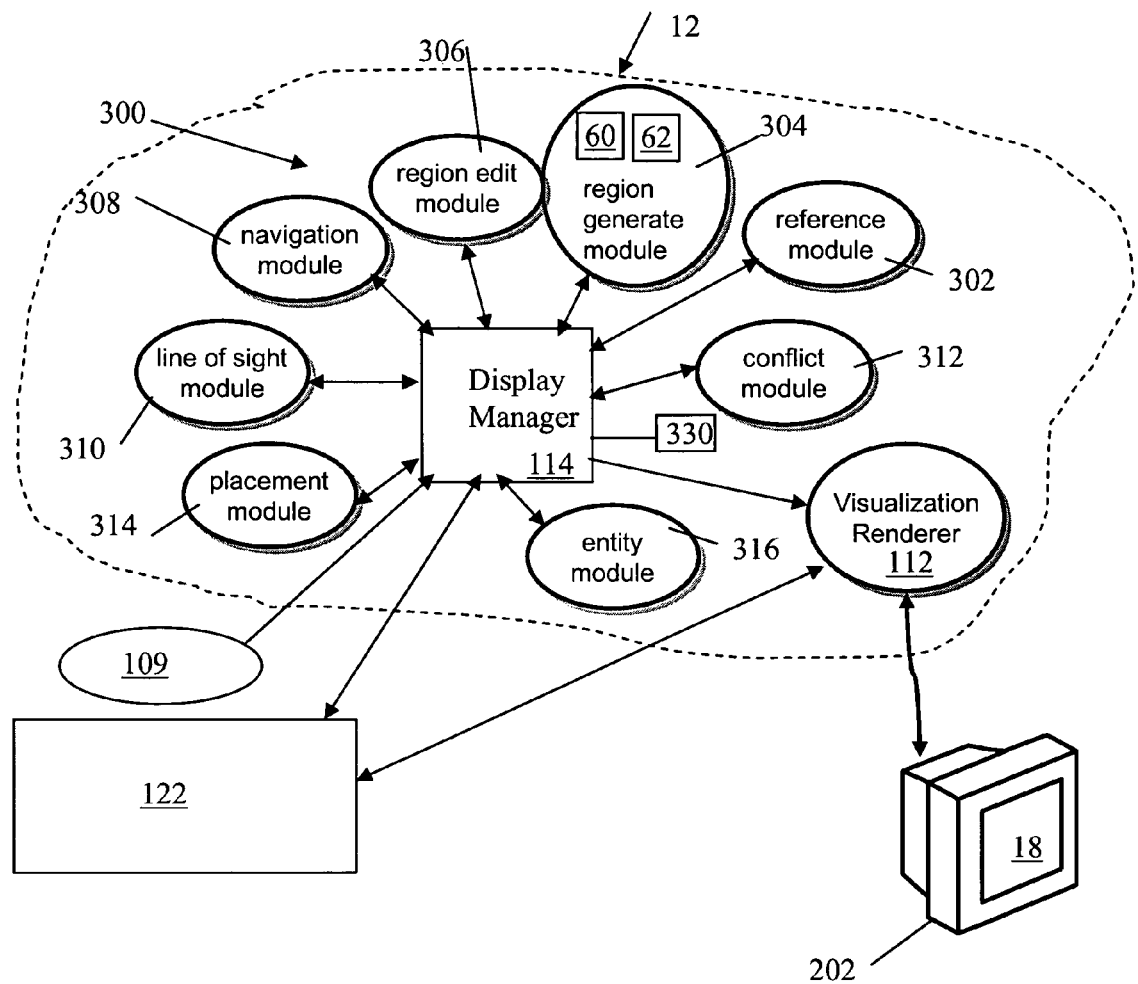
FIG. 5 shows visualisation tool modules of the tool of FIG. 3.

Referring to FIGS. 1 and 5, the interactive tool 12 provides for interactive, animated 3D Visualization of air traffic in the aerial domain 17 situated above the reference (e.g. terrestrial) domain 16. Traditional air traffic control systems provide a 2D, top-down view of the air-space environment. This can be a severe limitation, because it forces the controllers to deal with a 3D environment without providing any depth cues and other factors in association with the characteristics and physical content of the adjacent reference domain 16. For example, air regions 20 (e.g. corridors and/or areas) in the aerial domain 17 may pass above or below one another, yet still cross over the same point of the reference domain 16 (e.g. point on the ground). This crossover would not be correctly represented in a 2D visualization, erroneously causing the appearance of a conflict. For example, referring to FIG. 7, it is recognised that the visualisation 18 can contain two or more air regions 20 (paths 22 and/or volumes 24), where overlapping portions 36 of the regions 20 can occur. These overlap portions 36 can be visually distinguished (e.g. via colour and/or texture/shading) from the individual air regions 20.

Referring again to FIG. 5, one embodiment of the tool 12 is configured to present air corridor/area information of the air region 20 (for example as the air corridor/path 22 shown in FIG. 1a or as the air volume 24 shown in FIG. 2a) in a 3D visualization, projected over a representative model of the real-world terrain representing the reference domain 16. This provides for the tool 12 to not only visually represent crossing (e.g. overlapping portions 36) air paths 22 and volumes 24, but also conflicts with the terrain and/or elements 14 associated with the terrain (e.g. man made and/or natural structures), i.e. the overlap portions 36 can be used to represent conflicts between the air regions 20 and between the air regions and the reference domain 16 (including associated elements 14). This terrain model (e.g. reference domain 16 with added domain elements 14) can be created or otherwise generated by a reference domain module 302 from precise satellite imagery using a terrain, allowing for a realistic visualization of the terrestrial environment. It is recognized that the reference domain 16 could also be represented as a flat plane or other arbitrary surface for use as a common coordinate system for reference 16 and aerial 17 domain based elements 14. For example, the reference domain 16 could be represented as a grid specifying latitude and longitude as information overlay elements 14 (including indications of north, etc. . . . ), as desired.

It is recognised that the tool 12 represents the air corridors 22 as three-dimensional geometrical constructs/shapes in the visualization representation 18, as opposed to just a line/vector indicating the aircrafts trajectory. Providing for the three-dimensional nature of the air corridors 22 can give a more accurate representation of flight paths and potential conflicts between airborne elements 14 and variations in elevation of the reference domain 16 (e.g. mountains, towers, buildings, etc. . . . ). For example, referring to FIG. 2, the bottom boundary 26 (e.g. a 2D projection of the boundary 26 onto the surface of the reference domain 16) of the air volume 24 can be used to denote interaction of the air volume 24 with the physical geometry (man-made and/or natural) of the adjacent reference domain 16. It is recognised that the bottom boundary 26 of the air corridor 22 (see FIG. 1) can also have this 3D variation (not shown), as desired. It is recognised that the geometry of the links 34, intersection regions 38 (e.g. control elements 30) of the links 34, and the geometrical shape of a cross-section 40 of the air regions 20 (see FIGS. 1a and 2a) can be other that shown (e.g. square, rectangular, cylindrical, circular, arcuate, linear, etc. . . . ). It is also recognised that the tool 12 can toggle (e.g. on/off) the 3D view of the air regions 20 and the respective domains 16,17, thus providing for showing the associated 2D projection of the air region 20 on the reference domain 16 to facilitate traditional map-based planning techniques.

The tool 12 also has a number of other modules 300, such as but not limited to the display manager 114 for coordinating the interaction of associated modules 300 with the user inputs 109 for rendering the representation 18 of the aerial 17 and reference 16 domains (including the elements 14 and air regions 20) to the display 202. The tool 12 also has an air region generation module 304 for generating the air regions 20, an air region edit module 306 for editing already generated air regions 20, a region navigation module 308 for navigating along or otherwise within a selected air region 20 of the representation 18, a line of sight module 310 for reconfiguring the representation 18 to display line of sight characteristics of the reference domain 16 with respect to other point(s)/area(s) of the aerial 17 and/or reference 16 domains, a placement module for positioning entities in the aerial and reference domains, and a conflict module for 312 detecting conflicts (e.g. overlap regions 36) between adjacent air regions 20 and between air regions 20 and the reference domain 16. The tool 12 also has a reference module 302 for editing or otherwise creating visual characteristics of the reference domain 16 (e.g. adding entities 14 such as vehicles and natural/man-made structures). The tool 12 also has an entity module 316 for generating the entities 14 for placement in the air-space environment and for assigning properties to the entities 14 (e.g. speed, location, physical description, status, etc. . . . ).

Air Region Generation Module 304—Creating Air Path 22 and Control Areas 24

Figure 2A:
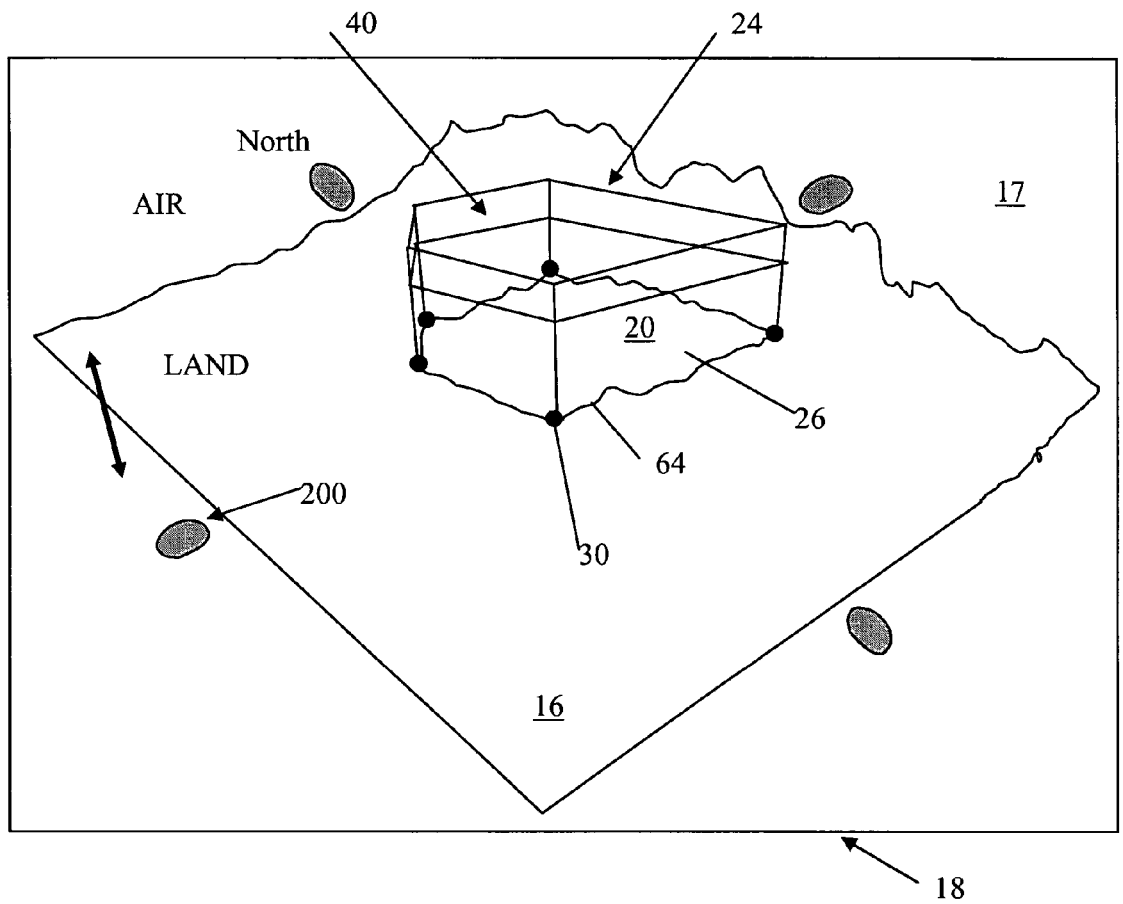
FIG. 2a is a further schematic diagram showing a visualisation representation of an air region example.

Referring to FIGS. 1a, 2a, and 5, the module 304 can be used to simplify the difficulty that is inherent in creating air regions 20 in a 3D environment. This is done by having the user define a general region (e.g. path/volume) by clicking points 30 on the (essentially two dimensional) reference domain 16 (e.g. terrain) and/or in the aerial domain 17, and later refining the control points 30 to achieve the intended result. By doing so, the problem of choosing location in a 3D environment with a 2D input device and a 2D display is reduced. The air path 22 can be defined as a directional path for connecting a specific departure location with a destination location, such that the locations can be in any point of the air-space environment. The air volume 24 can be defined as a portion of the aerial domain 17 that can potentially include a plurality of individual (or otherwise unspecified) directional paths. It is recognised that the air regions 20 can also be generated programmatically (i.e. automatic generation of the control elements 30 and the link elements 64) from data sources (not shown) according to a rules based algorithm (for example) coupled to the generation module 304. The input data for generating the air regions 20 can be provided from the data sources such as but not limited to live/stored data, and/or via another application (either inside the data processing system 100 or networked from outside the data processing system 100) that communicates messages to the tool 12.

The mouse clicks (or other user event 109) that the user employs to define the control points 30 (or control region in the case where an initial shape—e.g. cylinder—is placed at a particular location on the reference domain 16). This location can be initially in a world coordinate system of the reference domain 16, meaning that a map perspective setting of the tool 12 can cause the user to choose the points 30 (or control shapes—hereafter referred to generically as control elements 30) along the 3D terrain, which the generated control elements 30 can then be mapped to a 2D coordinate on the map of the reference domain 16, or if provided with a height dimension (e.g. via user event 109) the module 304 places the control element 30 in the aerial domain 17. For example, x and y coordinates that result from the reference domain 16 mapping can be used to define the center of the latest control element 30 in the reference domain 16. By using this method, the user is not necessarily limited to a 2D, top-down view of the map when creating the air regions 20. Accordingly, it is recognised that the control elements 30 (otherwise referred to as control elements) can be positioned at a number of locations on (or off) the reference domain 16.

Accordingly, the module 304 has a control element generator 60 for generating the control elements 30 according to user events 109 and/or in connection with information supplied by the templates 32. Further, the module 304 has a link generator 62 for generating connections 64 (see FIGS. 1a and 2a) that result in defining the bounding surfaces 26,38 enclosed by the connections 64 and control elements 30.

Figure 6:
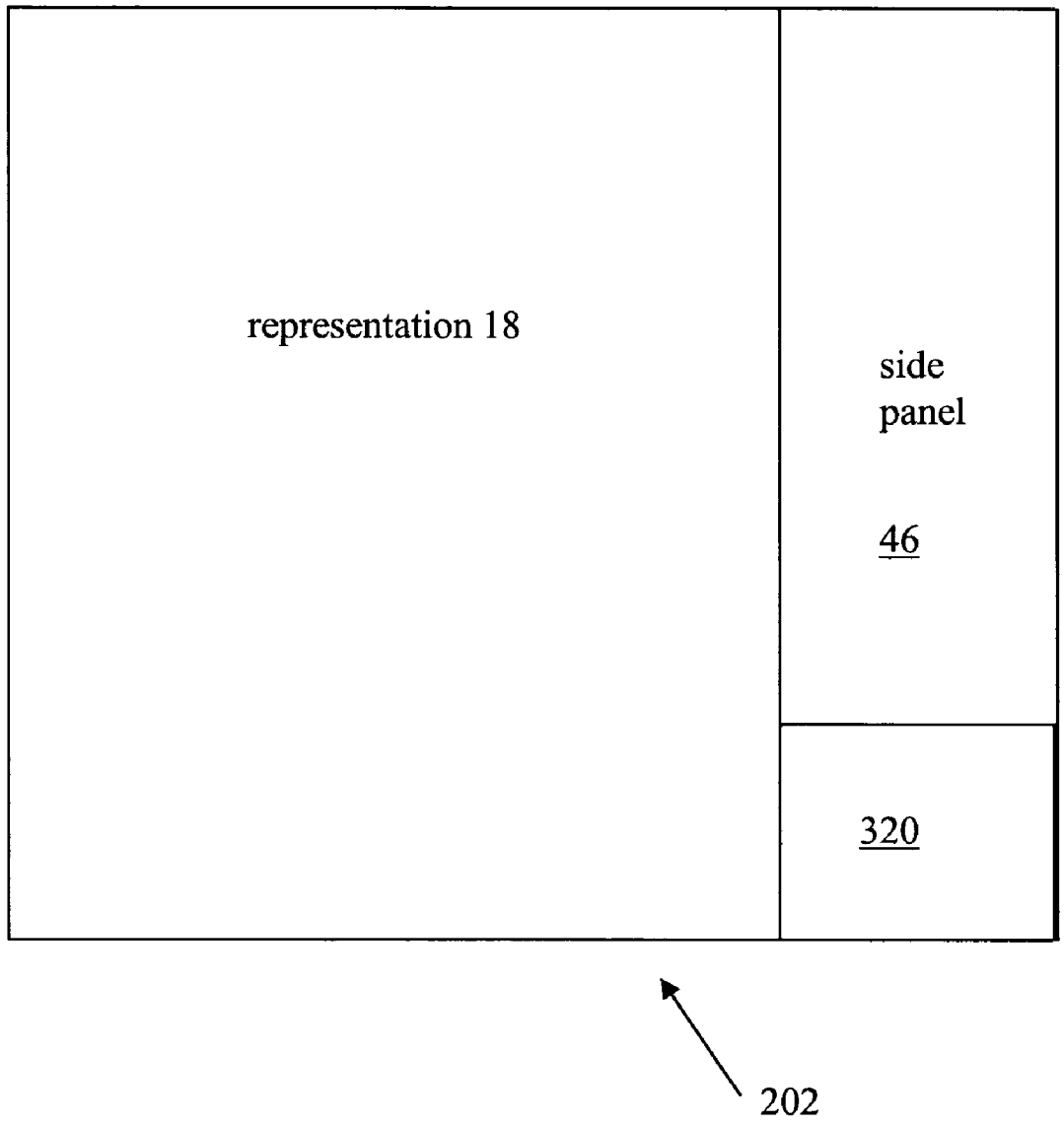
FIG. 6 shows an example layout of a visual interface of the data processing system of FIG. 3.
Figure 14:
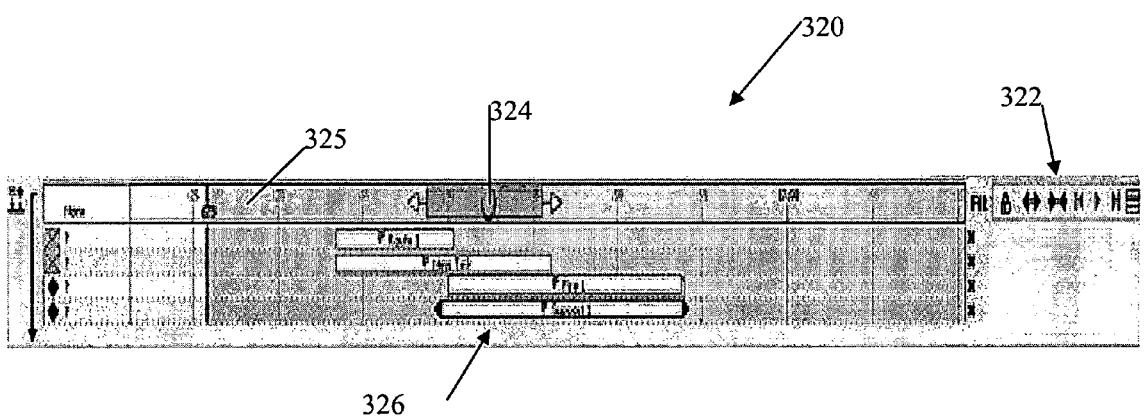
FIG. 14 shows an example tool bar of the user interface of the tool of FIG. 4.

Once the control elements 30 have been generated, they can be examined within the 3D scene provided by the visualization representation 18 by rotating the scene or zooming in/out of the scene, as per user events 109 associated with a toolbar 320 (see FIGS. 6 and 14). This examination is facilitated through the use of panning, zooming, and rotation tools 322 that are integrated within the application and part of the toolbar 320, for example, or optionally through the use of modifier keys in conjunction with a right mouse button, as provided by the user interface 108 (see FIG. 4). The 3D scene of the visualization representation 18 can be animated smoothly from viewpoint to viewpoint during examination by the user when using the analysis and visualisation manipulation features of the visualization tool 12.

Creation of Air Pathways 22

Referring to FIG. 1a, Air paths 22 are initially created by the generation module 304 via user events 109, for example by simply clicking on the 3D map terrain. These clicks cause the generation module 304 to create control elements 30, which are then connected sequentially to define the air path 22. These control elements 30 can be visualized as 3D shaped objects (such as but not limited to cylinders and spheres for defining a localized volume) which hover above the terrain, at the location user specified on the reference domain 16. As the user clicks, the generation module 304 then creates the air path 22 via links 34 to incorporate the latest control element 30. To signify the end point in an air path 22, the user can create the final control element 30 by double-clicking and then later refining the control elements 30 along the air path 22 to achieve the intended result (e.g. air path volume desired size and overall geometrical shape).

The air path 22 that is created by the module 304 is a sequential joining of the control elements 30, shown by a 3D representation of the space (i.e. links 34) between the control elements 30 (in this case cylinders 42). The overall volume encompassed by the air paths 22 (i.e. the combination of the control elements 30 and the links 34) can be altered by editing the air paths 22 once the initial layout has been completed using the edit module 306, described below. The links 34 are defined by the connection 64 visual elements.

Air Volumes 24

Referring to FIG. 2a, Air Control volumes 24 are created by the module 304 in a similar manner. However, clicking to create control elements 30 (in this case points) results in a closed polygonal area (e.g. represented by shape 40), not a linked 34 path. These volumes 24 can be used to represent zones such as no-fly areas or airspace monitoring. All control elements 30 for the air volumes 24 can lie on the same plane as one another, so adjusting the height properties for one point 30 can result in the others being adjusted also. Further, it is recognized that viewing points 200 of the representation 18 can be manipulated by user events 109 to change the magnification and/or orientation of the reference domain 16 (and coupled air region 20) with respect to the view seen by the user of the tool 12.

Figure 1B:
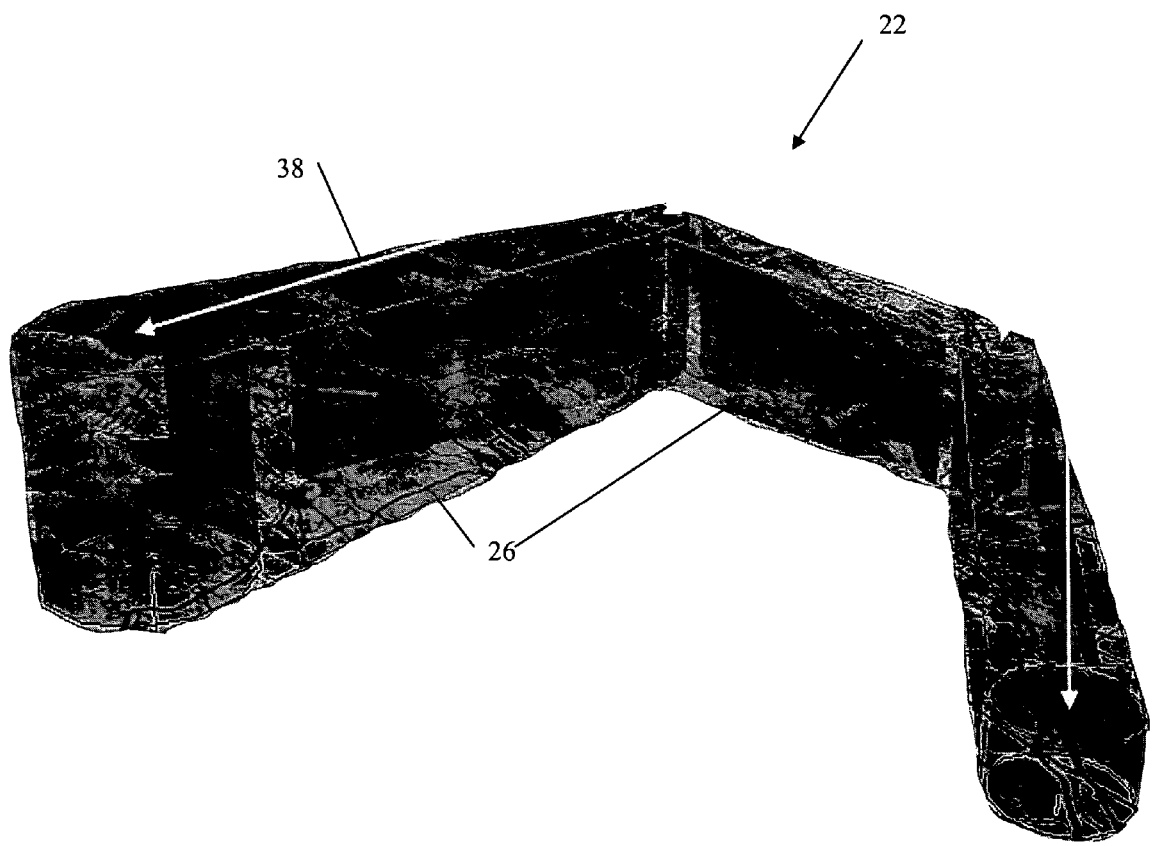
FIG. 1b is a further embodiment of FIG. 1a showing translucent surfaces of the air region.
Figure 2B:
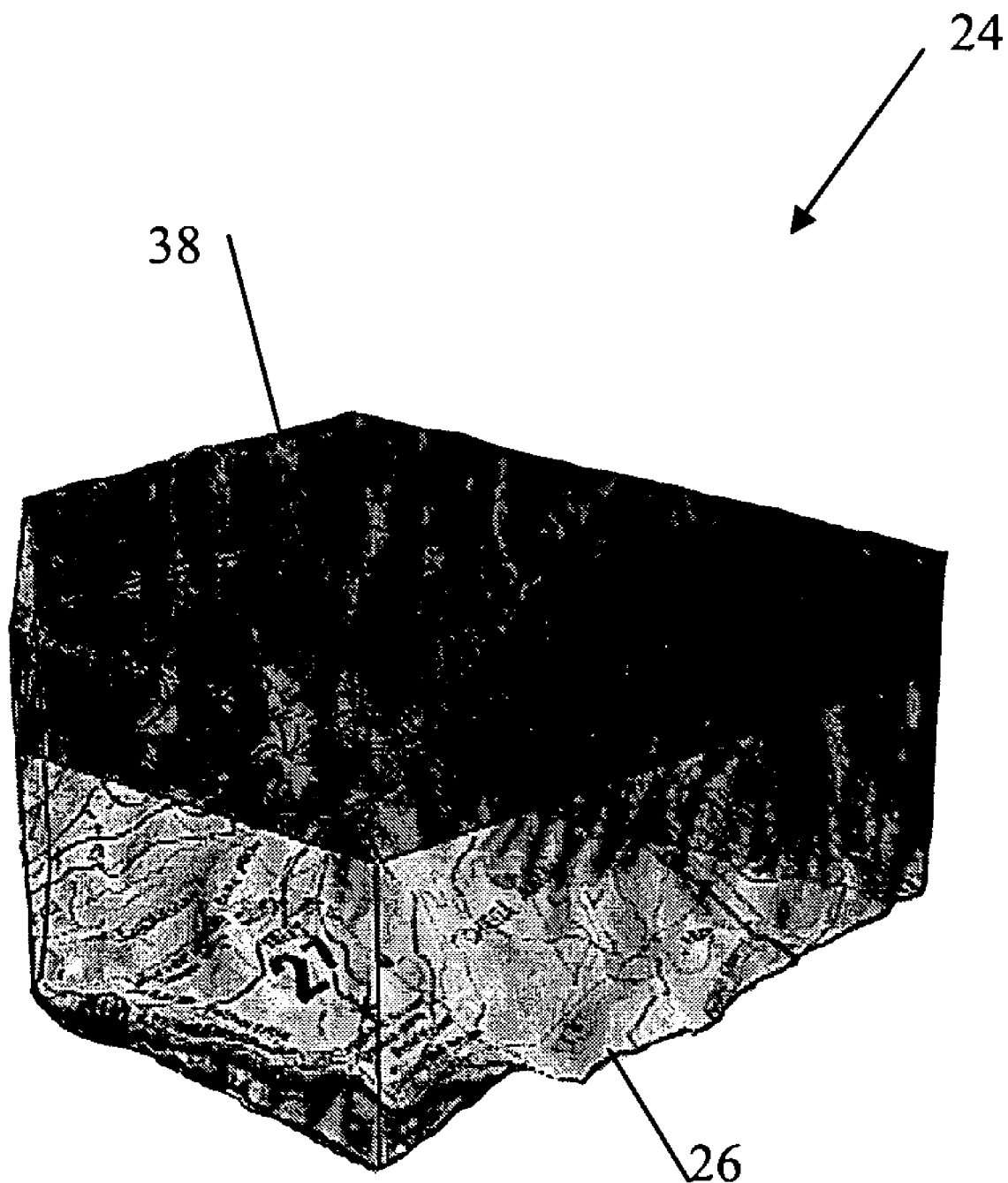
FIG. 2b is a further embodiment of FIG. 2a showing translucent surfaces of the air region.

One embodiment of the air regions 20 is shown in FIGS. 1b and 2b, wherein the volumes of space of the air region 20 are visualized by the use of a translucent box comprised of bounding surfaces 26,38, such that each of the surfaces 26,38 is shaded with a user-defined color (or texture/shading). These translucent volumes of the air regions 20 allow the user to reason about the space between control elements 30 without having the volumes obscure objects in the background (e.g. of the aerial 17 and/or reference 16 domains). The translucent surfaces 26,38 of the air regions 20 bounding box can be additive, causing rear surfaces to appear darker. This is because light has to pass through both the front and rear surfaces 38 before reaching the user's viewpoint. This technique is employed as opposed to simply not drawing occluded surfaces 26,38. This drawing technique, coupled with the use of solid edges along the bounding volume, further reinforces the notion of an adjustable physical space of the air region 20 and therefore helps to give a visual shading of the air region 20 without obstruction of underlying visual features associated with the domains 16,17.

It is recognised that the module 304 can also assist the user by editing the air paths 22 and volumes 24 by additional points (e.g. control elements 30) inserted into the air region 20 after finalization through the use of a context menu provided in the control panel 46. further, it is recognised that the air regions 20 do not always have to shape themselves to meet at the width of the control elements 30 (e.g. periphery of the control shape such as top and bottom diameters of the cylinders shown in FIG. 1). for example, a predefined air region 20 format can be used by the module 304 to defines the width of the air region 20 independently of the location and/or dimensional aspects of the control elements 30.

Edit Module 306—Editing Air Regions 20 in Real-Time

The edit module 306 provides for adjustment of; height mapping of the air regions 20 above the reference domain 16, coupling of the bottom surface 26 to conform to terrain detail, representation of bounding surfaces 38 between the control elements 30, properties of air regions 20 (e.g. dimensions) and other characteristics of the air regions 20 (e.g. labels, colouring, etc. . . . ), as desired. It is recognised that the operation of the edit module 306 can apply to both user defined air regions 20 and templates 32.

Figure 8:
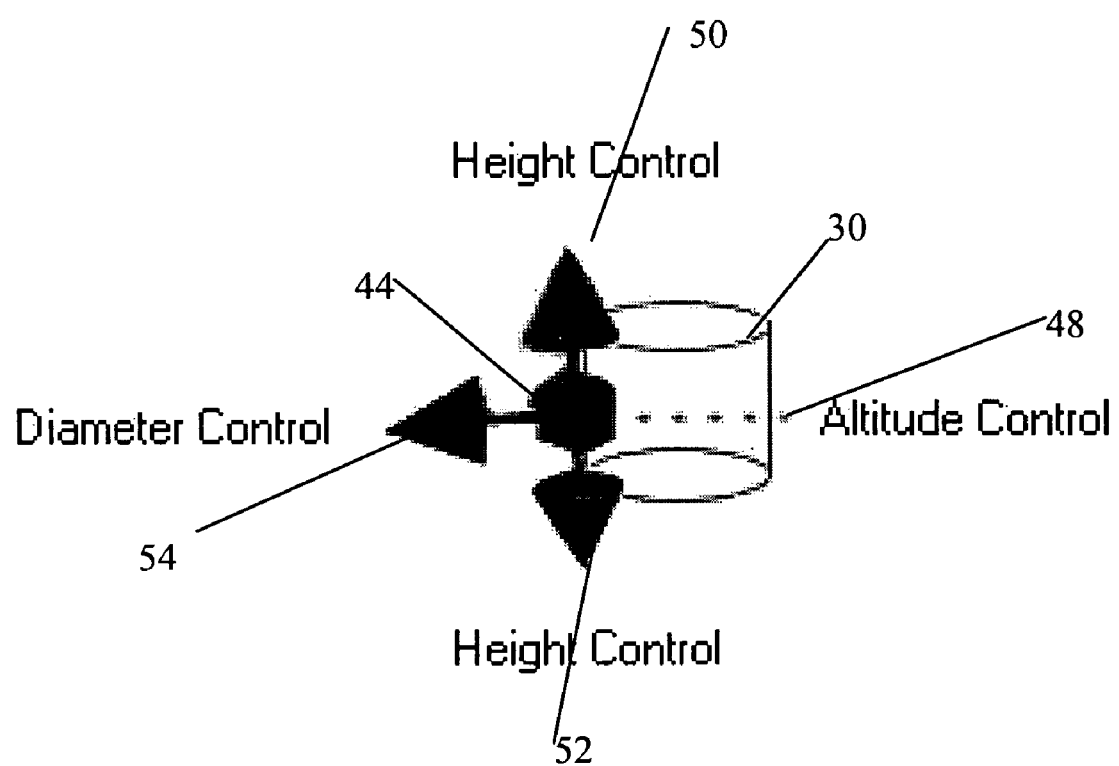
Figure 9:
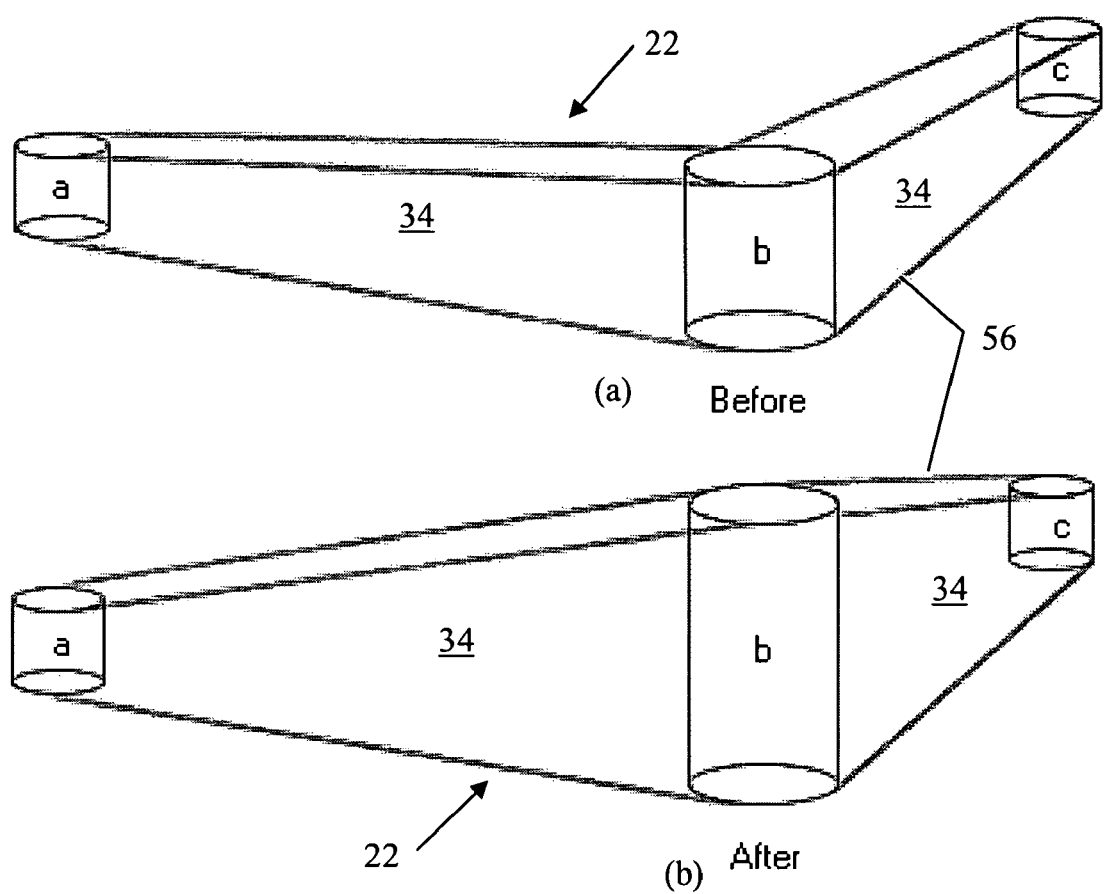
FIG. 9 shows an example operation of the mechanism of FIG. 8.
Figure 10:
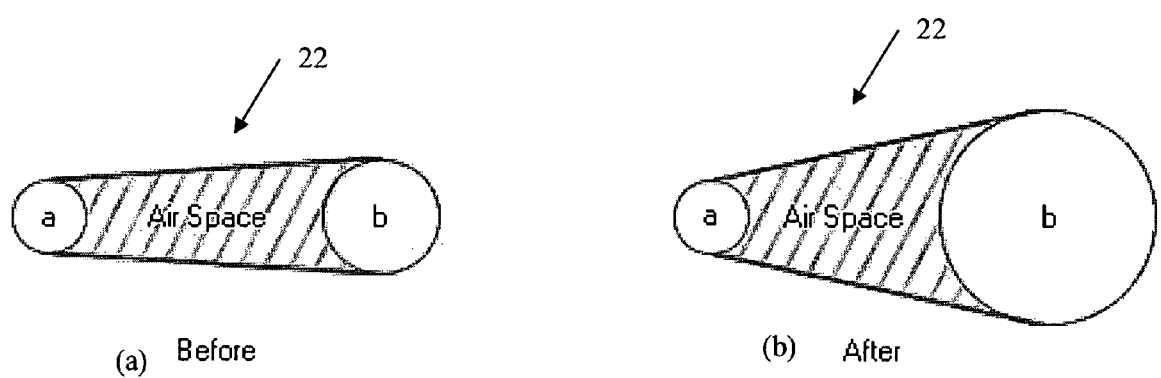
FIG. 10 shows a further embodiment of the operation of the mechanism of FIG. 8.

Referring to FIGS. 8, 9, and 10, as changes are made to the control elements 30 via the module 304, the changes are correspondingly updated on the representation 18. Changes can be smoothly animated in the 3D scene of the representation 18 as the user moves the 3D controls provided by the toolbar 320. Quantitative feedback is provided by the tool 12 to the user by continuously updating the display of numerical properties of the control elements 30, and other display elements of the visualization representation 18, in the side panel 46. This updating of the side panel 46 and/or representation 18 contents can be done in both an interactive fashion, in response to adjusting control handles 44 of the control elements 30, and/or programmatically, by entering specific values in a properties panel 46 for the elements 30, which can be in the representation 18 and/or the side panel 46—see FIG. 6. The following example operation of the module 304 is described using handles 44 as an embodiment of an adjustment mechanism, by way of example only.

Referring to FIG. 8, vertices (e.g. control elements 30) of the air path 22 are given initial default properties, including elevation, height and width. These properties are modified interactively through the module 304 and user events 109 by clicking on a desired control element 30, which causes a set of 3D editing control handles 44 to appear. For example, an altitude control 48 allows the user to adjust the control cylinder's 30 distance from the ground (i.e. reference domain 16), while keeping the actual height of the cylinder 30 constant. By dragging the control 48 up or down, the cylinder's 30 altitude in the representation 18 is updated in real-time. Dragging or otherwise manipulating an upper height control 50 causes the top of the control cylinder 30 to grow upwards (or shrink), while a lower height control 52 causes the bottom of the cylinder 30 to grow downwards (or shrink). This allows the user to adjust the height of the cylinder 30 (and thus the height of the adjacent air region—e.g. path 22), while keeping the baseline altitude constant, as shown in FIG. 9a before the control cylinder "b" height is adjusted and in FIG. 9b after the control cylinder "b" height is adjusted. It is noted that the relative sizes and locations of the control cylinders "a" and "c" remain constant, while the linear elements 56 comprising the links 34 are adjusted by the module 304 accordingly.

Referring again to FIG. 8, a diameter control 54 causes the module 304 to adjust the diameter of the control cylinder 30 to increase or decrease, depending on whether it is dragged away from the cylinder 30 or towards it. Doing so also causes the air path 22 to widen as it approaches the cylinder "b", as shown in FIG. 10a before the diameter adjustment and in FIG. 10b after the cylinder "b" adjustment. Further, the location of the control cylinder 30 with respect to the coordinate system of the reference domain 16 can be adjusted by the module 306 and user events 109 by grabbing the top face of the control cylinder 30 and dragging it around the terrain, thus causing an adjustment to the geometry of the air path 22 (e.g. the angle between links 34 attached to the control cylinder 30 would be modified). To move the entire air path 22, the user can first unlock path movement from a context menu of the side panel 46 (see FIG. 6), and then the user can click on the path 22 edges and drag the entire air path around the reference domain 16, thus retaining the geometry of the air path 22 during movement of the air path 22.

Further, the user may also edit the properties of all control elements 30 in the air region 20 by double-clicking on the air region 20, causing the control handles 44 for all control elements 30 to appear. Adjusting any of these control elements 30 via the edit module 306 causes the adjustment effects to be applied to each control element 30 in the air region 20. This allows for a simple method of raising, lowering, or resizing the entire air region 20. Several other properties of the air region 20 and its control elements 20 can be altered non-interactively, by standard text-based menus accessed in the side panel 46 and/or by using the appearance of an edit panel (not shown) in the representation 18 for selected control elements 30 by using a mouse-over technique. These visual properties of the air region 20 can be such as but not limited to:

Label—The name assigned to the air region 20;
Location—MGRS coordinates for the control element 30;
Latitude—Real-world coordinates;
Longitude—Real-world coordinates;
Altitude—Distance from the ground reference (ground level or sea level);
Diameter—The diameter of the control element 30 (or width in the case of non-arcuate control elements 30);
Height—The height of the control element 30;
Reference—Sea or ground level. Changing this maintains the current altitude value, but alters whether the value is in relation to sea level or ground level of the control element 30;
Color/shading/Texture—The color/shading/texture used to distinguish the air region 20 from the surrounding air-space environment;
Transparency—Range from 0 to 1, 0 being opaque, 1 being transparent of the surfaces 26,38;
Visibility—Boolean value, whether or not the air region 20 is displayed; and
Distance—The total length of the air region 20.

It is recognized in the above described example operation of the edit module 306 that modifications to the air regions 20 are sent by the edit module 306 to the visualization renderer 112 for presentation on the visual representation 18 (see FIG. 5). Further, it is recognised that a number of the above-described adjustment techniques provided by the edit module 306 can be applied to an individual point used as the control element 30 or to a grouping of the points when used as control elements 30 to define a shape (e.g. the relative spacing between the grouping of points can be modified such as the diameter is adjusted in the case of the cylinder control element 30).

Navigation Module 308—Following Air Regions 20

Referring to FIG. 5, by selecting Follow Path from the context menu of the side panel 46, users can "fly" along/through the virtual air region 20 over the map terrain of the reference domain 16. Input 109 to the module 308 provides for recalculation of the visualisation representation 18 that is passed to the visualisation renderer 112, which allows the user to see the flight course from the pilot's field of view (i.e. the presentation of the reference domain 16 is shown on the visualisation representation 18 from the viewing angle of the pilot. For example, the up arrow on the keyboard of the UI 108 can cause the camera (representing the user field of view) to move forward along the air region 20, and the down arrow can move the camera backward. The right and left arrow keys can rotate the camera's viewpoint clockwise and counter-clockwise, respectively. The left/right mouse button of the user interface 108 (or other equivalent user interface mechanism) allows the user to change the pilot's field of view by looking right/left and/or up/down all the while moving in the air path (eg. air region 20).

Aerial Line of Sight Module 310

Figure 11:
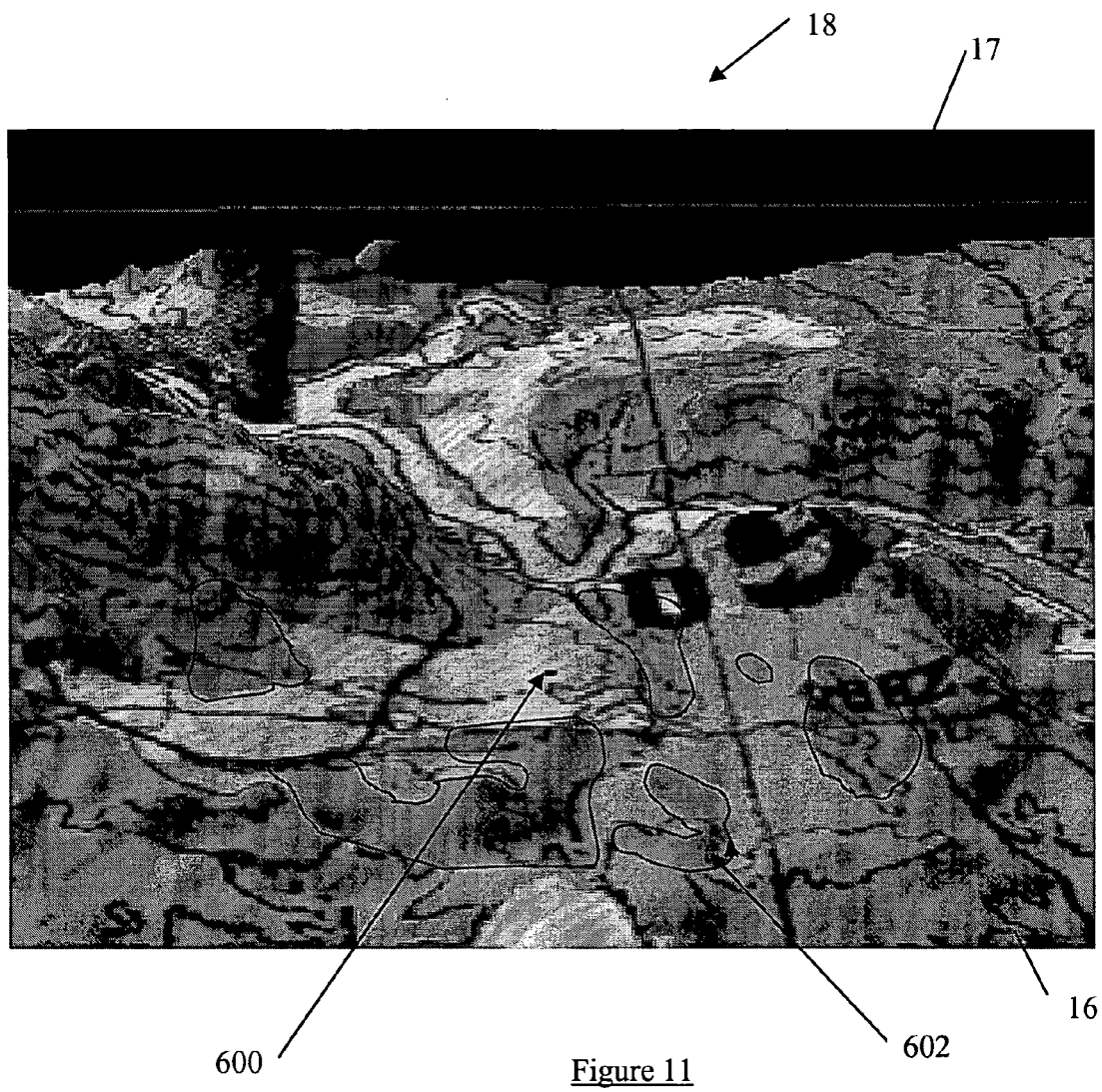
FIG. 11 provides an example operation of a line of sight module of the tool of FIG. 3.
Figure 12:
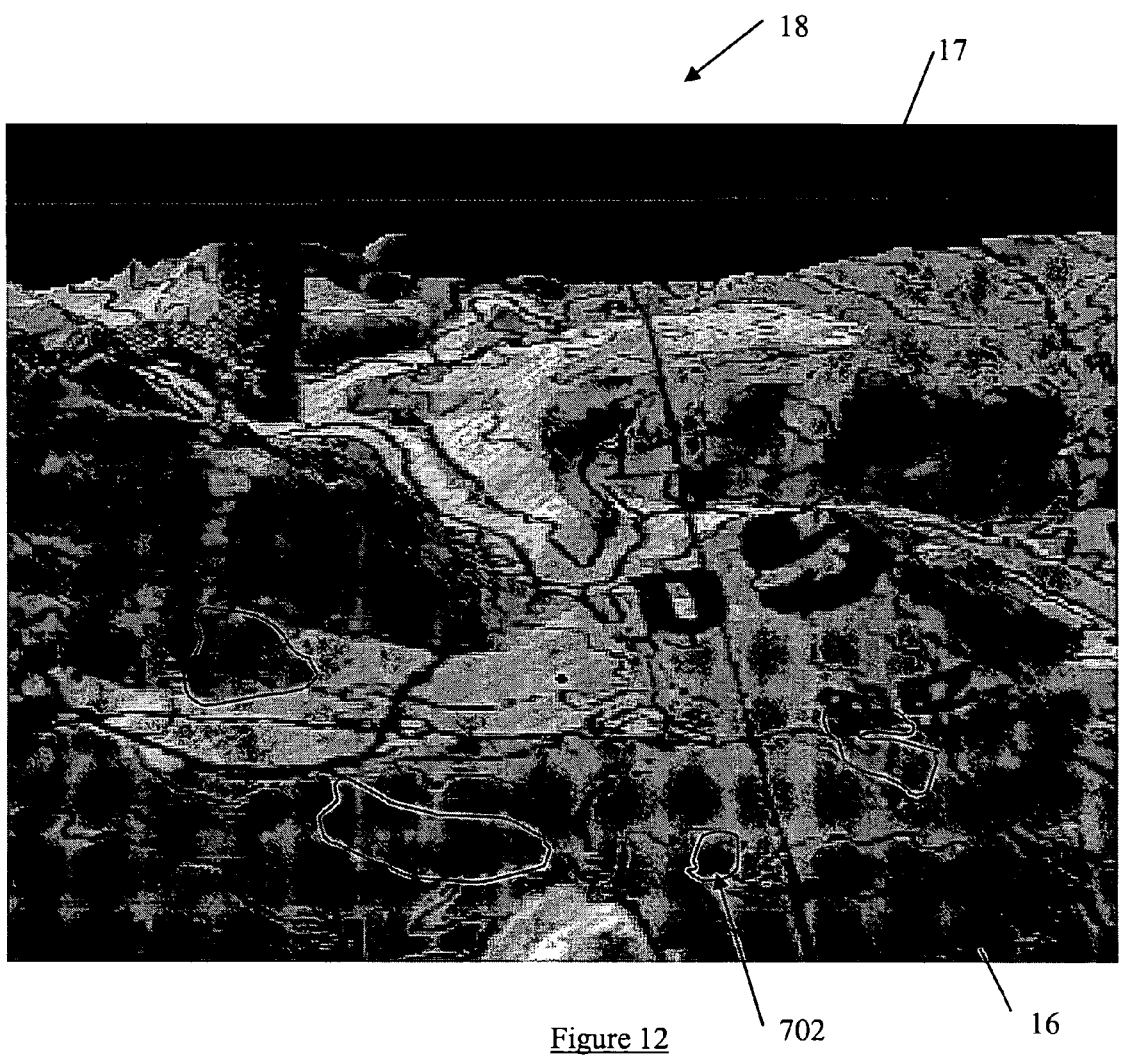
FIG. 12 provides a further example operation of the line of sight module of the tool of FIG. 3.

Referring to FIGS. 5 and 11 and 12, the tool 12 also provides a Line of Sight module 310, which simulates the regions of a reference domain 16 that are visible to a person or other reference domain based entity located at a particular map location 600 of the reference domain 16 of the visualisation representation 18. This can be done by the module 310, for example, by extending rays from the origin (map location 600 of the entity) in all directions for a pre-determined distance. If a ray intersects with the terrain of the reference domain 16, that part of the terrain is deemed to be visible. Anything behind the intersections is deemed hidden from view. For example, referring to FIG. 11, all areas of the elevation varied terrain of the reference domain can be seen by the user standing at the location 600, except for the occluded areas 602 representing bounded areas which are hidden from sight of the entity at the location 600. The module 310 provides calculated areas 602 to the visualisation renderer 112 for presentation on the visualisation representation 18. The areas 602 can be distinguished on the terrain of the reference domain, for example, through colour, texture, shading, and/or bounding lines, as desired.

The Aerial Line of Sight module 310 extends this concept of occluded areas 602, showing what can be seen from a viewpoint situated in the aerial domain 17 (e.g. in an air region 20). FIG. 12 demonstrates this operation of the module 310, illustrating the view of the reference terrain from an aerial location (not shown) from an altitude of 100 meters, with a viewing range of 3000 meters, for example. Occluded areas 702 of the reference domain 16 are not visible from the aerial location. The Line of Sight module 310 can also be applied to the air region 20, showing what can be seen/not seen across a range of control elements 30. This can be especially useful when coupled with air paths 22, visualizing the viewing range along an aircraft's flight plan. In turn, this also visualises points or the occluded areas 702 on the ground where the aircraft is not visible, facilitating planning of safe routes through hostile territory.

It is recognised, in context of the above described operation, that the module 310 could also be used to generate occluded areas (not shown) of air regions 20 calculated based on either locations 600 in the reference domain 16 or from locations (not shown) in the aerial domain 17.

Figure 15:
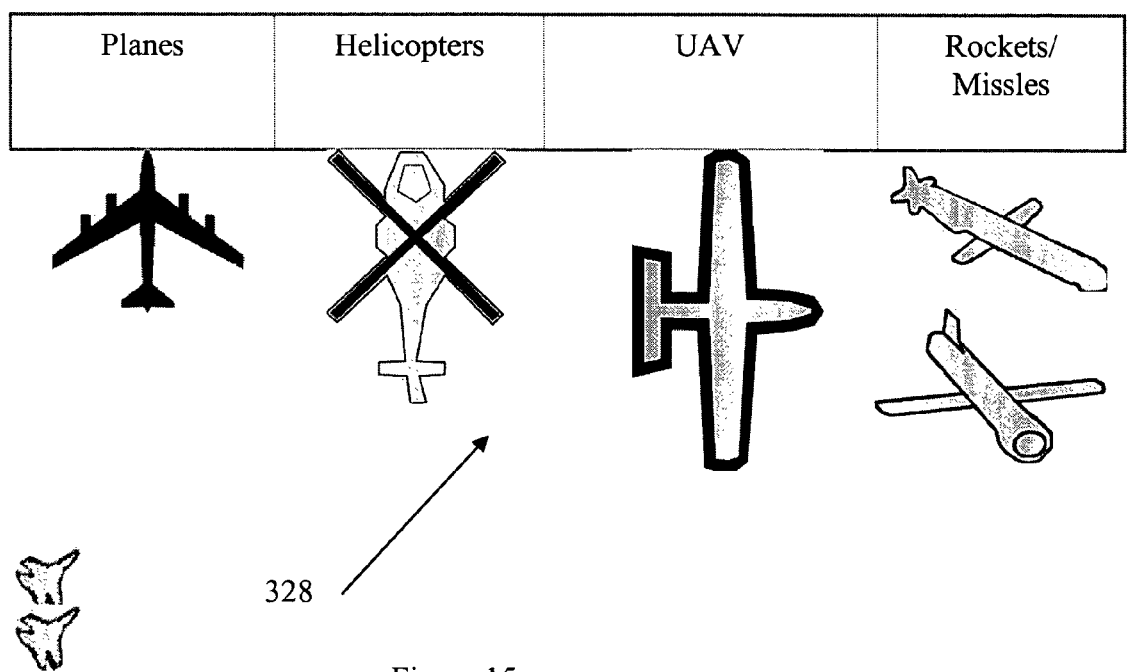
FIG. 15 shows example icons for display in the visual representation of FIG. 1.

Entity Placement and Simulation Module 314—Synchronizing Air and Ground Maneuvers As the 3D air regions 20 exist as part of a larger application, they are also privy to information provided by other objects/entities 14 in the scene of the representation 18. This facilitates for the coordination of operations between air and ground forces of the combined reference 16 and aerial 17 domains, including temporal synchronization, through the use of interactive time-distance functions of the side panel 46 and the toolbar 320. Each entity's 14 real-time position, orientation and velocity can be shown in the 3D scene of the representation 18 by moving the entity icon 14 in a corresponding way (e.g. by the user). Entities 14 animate in the scene of the representation 18 to reflect updates to their position, as controlled by the user of the tool 12 (for example). Each entity 14 in the scene has a projected forward movement path (represented as an air region 20 for air based entities 14 or as a ground region 58—see FIG. 1a) that can be stretched out over both distance and time. Trajectories (e.g. air region 20) for the past user-selectable period of time (via a time selector 324—see FIG. 14) can also be shown for each entity 14. These trajectories form trails that can also be displayed on the visualization representation 18, as desired. Entity icons 328 are used to display the location of the entities 14 on the representation 18, examples of the icons 328 are shown in FIG. 15. The monitoring of movement of the entities 14 within the scene of the visual representation 18 and determination of appropriate corresponding update data for display on the visualization representation 18 can be provided by the module 314.

The tool 12 allows for the coordination of forces by selecting the air path 22 (example region 20) or ground entity 14 and associated ground region 58 and setting a destination and arrival time. Movement along this time is interpolated by the module 314 according to the time span for the regions 20,58; as time progresses, the movement of the entity 14 is updated along its region 20,58 (for aerial and/or ground paths). Feedback is provided via the updated representation 18 (update data generated by the module 314 and passed to the visualisation renderer 112) to show, for example, what airspeed the planes must fly along the air paths 22 at to reach the selected destination of the reference domain 16 at the correct time. Using this module 314 for a combination of several air regions 20 and ground forces (e.g. entities 14) provides for the synchronization of maneuvers across units.

Referring to FIG. 14, users of the tool 12 can navigate backwards and forwards in time (as shown via corresponding temporal changes of the entities 14 and associated visual elements of the visual representation 18) through the use of a interactive timeline 325 and the time selector 324 showing the user the current temporal position of the visual representation 18 in the timeline 325. The tool bar 320 can also include a list of planning tasks 326 associated with the user in respect to the visual representation 18 (e.g. specific events, analysis to do, links to past analysis, etc. . . . ). It is recognised that the tasks 326 can be associated with portions of the timeline 326, as desired. Through the use of this timeline 325 (e.g. Gantt Chart-like), standard interactive chart adjustments can be provided. for example, by dragging the time selector 324 back and forth, users can plan future actions and review prior movements with respect to the scene under review in the visual representation 18.

Figure 13:
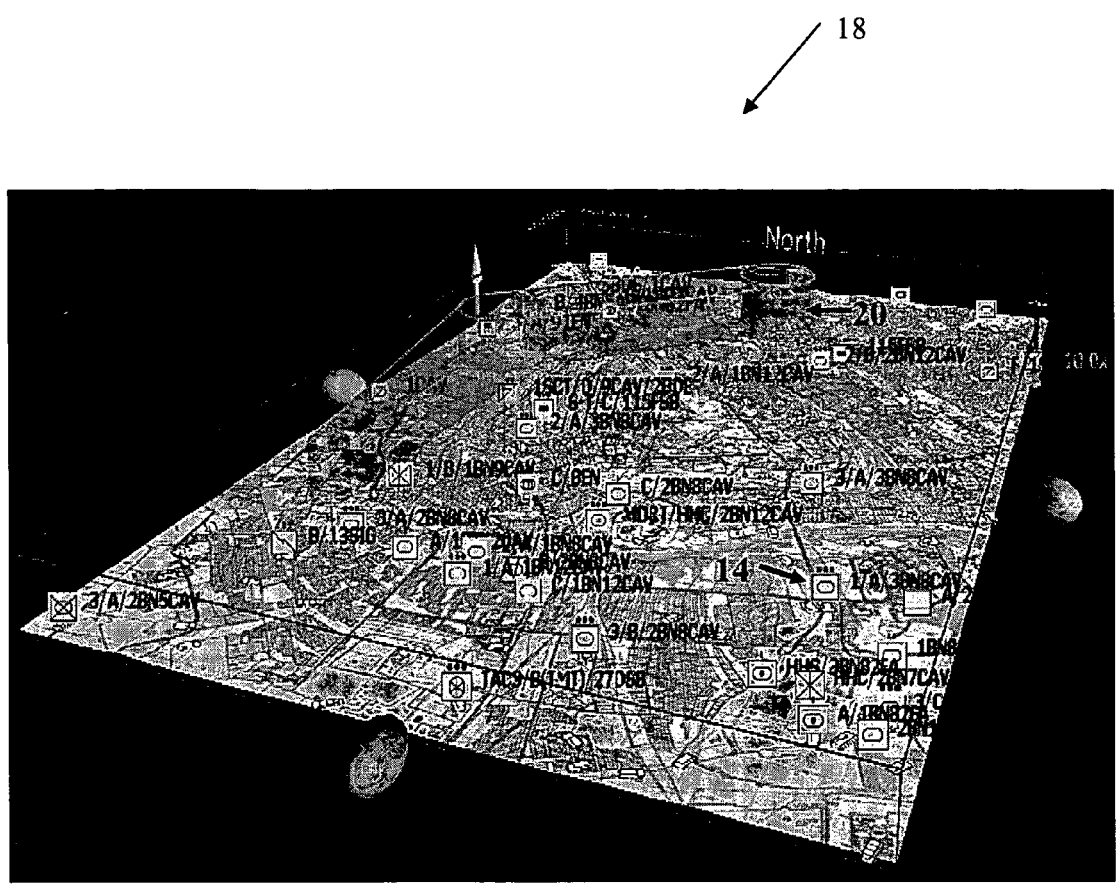
FIG. 13 provides an example operation of a placement module of the tool of FIG. 3.

Seeing entities 14 in context provided by the placement module 314, see FIG. 13, gives the user a more implicit understanding of the scenario/scene, allowing for plans to be created and reviewed within the visualization representation 18 with respect to interactions over space and time of air regions 20, ground paths 58 and entities 14 associated with the regions 20 and paths 58. It is recognised that What If'ing (rapid planning experimentation) is enabled due to the complete scene construction provided by our tool via the representation 18. Terrain features and air & ground forces are all accurately depicted and simulated, meaning that plans that are created in the system will correspond to what is actually executed in the field. Quick adjustments to plans, entities, and air paths allow for instantaneous modification of scenarios, providing a visual feedback to the user.

Further, it is recognised that the module 314 reacts to user events 109 via the tool bar 320 (see FIG. 14) or other controls provided by the user interface 108 (see FIG. 4). For example, using the time selector 324 control, together with a database (e.g. tables 122—see FIG. 4) recording entity 14 locations and times at locations, allows for smoothly animated playback of the temporal history of the airspace entities in 3D as displayed in the animated visualization representation 18. Users can use this temporal display function to get updated on recent activity after being away from the display of the visualization representation 18 (during real-time tracking of battlefield events, for example) as well as for after action reviews of a complex series of related events.

Conflict Module 312—Detection and Display

Figure 7:
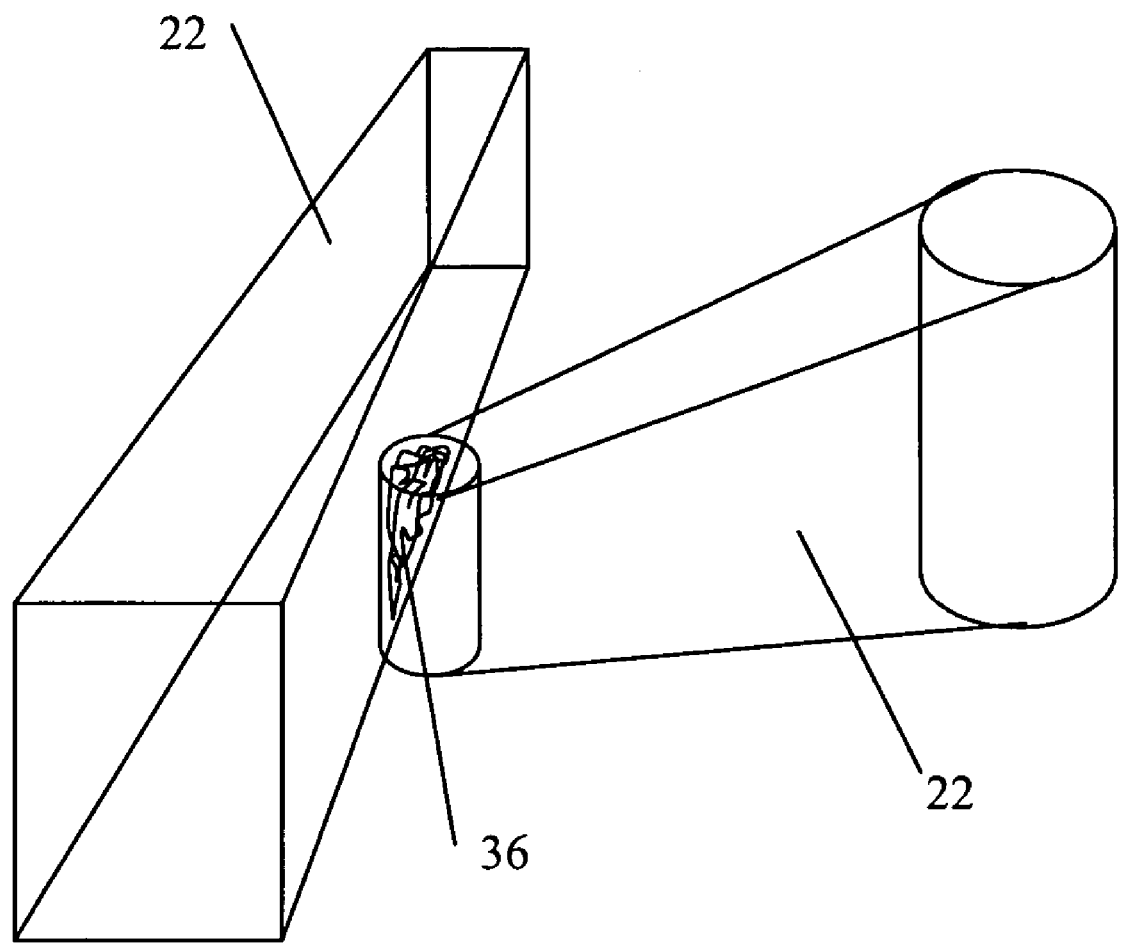

Referring to FIGS. 3 and 7, airspace deconfliction is simplified through the use of the conflict module 312. Volumetric intersections or overlap portions 36 between air regions 20 may occur during route planning, and could pose collision problems for actual aircraft flight. The module 312 incorporates an intersection algorithm to detect these intersections 36 in both time and space. These intersections 36 may or may not be intentional, so the user is given an option to be alerted to conflicts, or to just notice them visually. These conflicts could also be determined between air regions 20 and reference domain 16 based elements 14, and could be used to facilitate generation of the shape of the bottom bounding line/surface 26 of the air region 20 (see FIG. 2).

It is noted that the same principle can be applied to detect conflict between ballistic paths (an example of air region 20) and airspace corridors. If ground fire is scheduled to intersect with an air corridor, the module 312 will notice and allow for deconfliction. This deconfliction can be accomplished by the user with minimal change or disruption to the current course of action, because it is handled visually. The user can simply adjust the air corridor control elements 30 until the conflict is minimized or otherwise eliminated.

Further, referring to FIGS. 4 and 5, the user of the tool 12 can define alerts on conditions to be continuously computed and displayed on the visual representation 18 when a violation occurs, which can be monitored through the modules 312, 314. Examples of the violations can include alert status, existence and condition of the entities 14, as measured in relation to temporal and spatial constraints. These violations can be presented to the user as alerts (e.g. real time) via the visualization representation 18 (or via the side/control panel 46) to help the user monitor the status of the displayed scenario. Example alerts include time/velocity proximity within a certain time or distance, ageing of air regions 20 according to time of last use, intersection of air corridors (e.g. air regions 20 as per overlapping portions 36—see FIG. 7), and periodicity of air corridor/air region 20 usage throughout a scenario's time span. Accordingly, the modules 312, 314 can provide update data (e.g. alert data) to the visual representation 18 and/or control panel 46 to account for detected violations associated with the entities 14 and/or air regions 20 and/or terrain 16 (further including ground pathways 58 as desired).

Further, the modules 312, 314 can generate and/or update the air regions 20 to include alerts having content such as but not limited to: 1—Intersection conflicts of corridors/volumes/ballistics; 2—conflict due to time/velocity of corridor traversal; and 3—Temporal coloring including coloring (or other visual distinguishing—e.g. shading, line tyoe, etc. . . . ) the air region 20 according to time of last use and toggling of the air region 20 color/visibility according to periodicity of air region 20 usage (if the air region 20 is only in use for a certain time span, the air region 20 will only be shown—e.g. coloured—as active during that time of day).

Further, it is recognised that filters 330 (see FIG. 5) can be used to tailor the display of the visual representation 18 by the display manager 114 (for example or any other module/manager of the tool 12 as desired) such that only relevant information is presented, as defined by the filter 330 selected. For example, any alert type can be a filter 330, such that the user is presented with just those aircraft 14 in time/velocity proximity of ten minutes and 1,000 meters. In this case, the selected/defined filter 330 includes a specific entity 14 for a specific location (or locations) having certain operational characteristics (entity 14 physical characteristics in this case combined with selected temporal parameters). Filters 330 can also be set based on the values of properties of air regions 20 and entities 14, such as for example to just display air objects of type helicopter, or just display air regions 20 with an altitude of between 5,000 and 15,000 meters.

Figure 16:
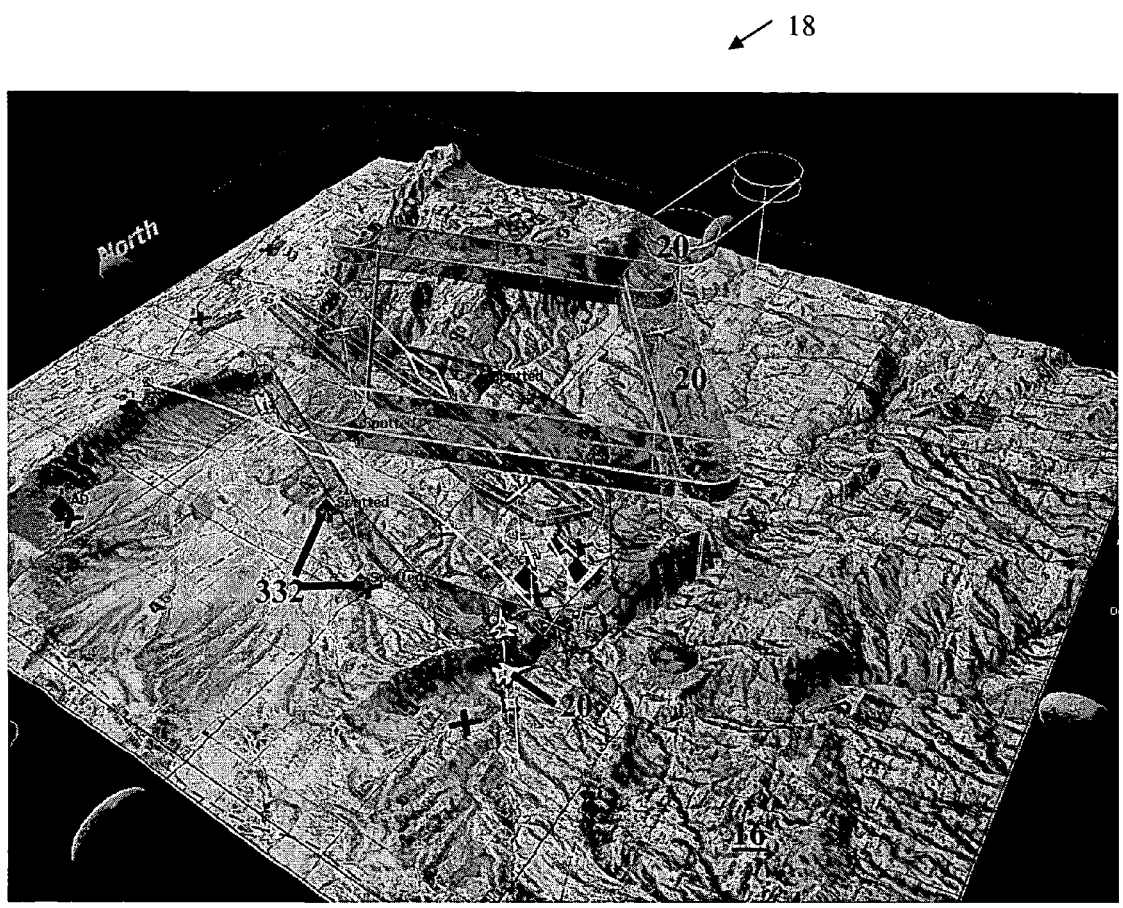
FIG. 16 is a further embodiment of the visualization representation of FIG. 11.

Further, referring to FIG. 16 shows an example visualization representation 18 including a plurality of air regions 20 with various entities 14 and scene information 332 related to movement (for example) of the entities 14. The scene information 332 can be provided by the placement module 314 (or other module/manager of the tool 12 as desired) as update data for inclusion in the visualization representation 18. The update data associated with the scene information 332 can be due to, for example, user events 109, automatic pattern recognition algorithms of the tool 12 in analysis of the data content of the visualization representation 18, and/or as data downloaded/uploaded from other external applications (e.g.—air traffic control systems or radio transmissions of ground units—not shown).

We claim:

1. A system for generating a region in an air-space environment for presentation in a visual representation, the region for positioning in an aerial domain of the environment coupled to an adjacent reference surface of the environment, the system comprising:

a data processing system including a user interface coupled to a processor to interact with user events to coordinate interaction of modules for generating the visual representation;

a control element generator module of the modules configured to provide a plurality of control elements of the region, the plurality of control elements for distribution in the air-space environment such that each of the plurality of control elements is coupled to a respective coordinate associated with the reference surface, each of the control elements defining a localized volume having a presentation property being an associated size, an associated shape or a combination thereof of the respective control element;

a link generator module of the modules configured to provide a plurality of link elements of the region for sequentially linking each of the plurality of control elements to one another such that both the control elements and the link elements define a plurality of bounding surfaces about the periphery of the region, the position of the link elements with respect to one another in the environment being related to said presentation property; and an edit module of the modules configured to adjust said associated size of a selected control element of the plurality of control elements and the corresponding volume of the selected control element to result in a corresponding adjustment in the link elements connected thereto and in a volume of the region defined by those said link elements approaching said selected control element.

2. The system of claim 1, wherein the plurality of control elements includes at least one two dimensional shape defining the region as an area or one three dimensional shape defining the region as a volume.

3. The system of claim 2, wherein the shape includes portions selected from the group comprising linear and arcuate and said at least one property is either a size or a shape of the control elements.

4. The system of claim 2, wherein at least one of the plurality of control elements represents an intersection region of the region between a pair of adjacent link elements of the plurality of link elements.

5. The system of claim 2 further comprising the generators configured to provide a plurality of the regions.

6. The system of claim 5, wherein each of the regions is a directional path for connecting a departure location with an arrival location.

7. The system of claim 6, wherein the each of the regions is selected from the group comprising an air path and an outer-space path.

8. The system of claim 2 further comprising a plurality of templates for providing predefined portions of the region selected from the group comprising the link elements and the control elements.

9. The system of claim 2 further comprising an entity module for generating an entity element for placement in the air-space environment and for assigning at least one property to the entity.

10. The system of claim 9, wherein a plurality of the entities are selected from the group comprising; a man-made structure, a natural structure, and a vehicle.

11. The system of claim 9 further comprising a simulation module for simulating temporal changes in the region and entity element and for simulating any interactions between the region and the entity.

12. The system of claim 2 further comprising a sight module for defining a hidden portion of the reference surface as seen from a field of view from a location in the region.

13. The system of claim 12, wherein the sight module is further configured for defining a hidden portion of the region as seen from a field of view from a location in the reference surface.

14. The system of claim 2 further comprising a navigation module for providing field of views of the reference surface as seen from a location in the region.

15. The system of claim 5 further comprising a conflict module for defining an overlap portion associated with at least one of the regions.

16. The system of claim 15, wherein the overlap portion is selected from the group comprising: an intersection of two adjacent ones of the regions; and an intersection between one of the paths and the adjacent reference surface.

17. The system of claim 2 further comprising the edit module configured to assign a translucency value to selected ones of the bounding surfaces.

18. A method for generating a region in an air-space environment for presentation in a visual representation on a user interface of a data processing system, the region for positioning in an aerial domain of the environment coupled to an adjacent reference surface of the environment, the method comprising the steps of:

providing a plurality of control elements of the region on the user interface, the plurality of control elements for distribution in the air-space environment such that each of the plurality of control elements is coupled to a respective coordinate associated with the reference surface each of the control elements defining a localized volume having a presentation property being an associated size, an associated shape or a combination thereof, of the respective control element;

providing a plurality of link elements of the region on the user interface for sequentially linking each of the control elements to one another to define a plurality of bounding surfaces about the periphery of the region, the position of the link elements with respect to one another in the environment being related to said presentation property; and adjusting said associated size of a selected control element of the control elements and the corresponding volume thereof to result in a corresponding adjustment in the link elements connected thereto and in a volume of the region defined by those said link elements approaching said selected control element.

19. The method of claim 18, wherein the plurality of control elements includes at least one two dimensional shape defining the region as an area or one three dimensional shape defining the region as a volume.

20. The method of claim 19 further comprising the step of providing a plurality of the regions.

21. The method of claim 20, wherein each of the regions is a directional path for connecting a departure location with an arrival location.

22. A computer program product for generating a region in an air-space environment for presentation in a visual representation, the region configured for positioning in an aerial domain of the environment coupled to an adjacent reference domain of the environment, the computer program product comprising:

a non-transitory computer readable medium comprising program code means stored thereon and executable by a processor of a computing device, apparatus or system for implementing the method of claim 18.

23. The system according to claim 1 wherein the link elements are connected to the control elements at the periphery of the control elements for defining the bounding surfaces of the region.

24. The system according to claim 1 wherein the edit module includes control handle elements for presentation in the visual representation, the control handle elements being for adjusting said presentation property of said at least one of the control elements selected from the group comprising: altitude; the associated size or the associated shape or a combination thereof.

25. The system according to claim 24, wherein the control handle elements facilitate independent adjustment of the altitude, the associated size, or the associated shape.

26. The system of claim 1, wherein the adjusting of said associated size is done while the size of a control element adjacent to said selected control element remains constant.

27. The method of claim 18, wherein the adjusting of said associated size is done while the size of a control element adjacent to said selected control element remains constant.

* * * * *